Feb. 17, 1953    V. E. GLEASMAN    2,628,508
HYPOID DIFFERENTIAL GEAR
Filed June 17, 1949
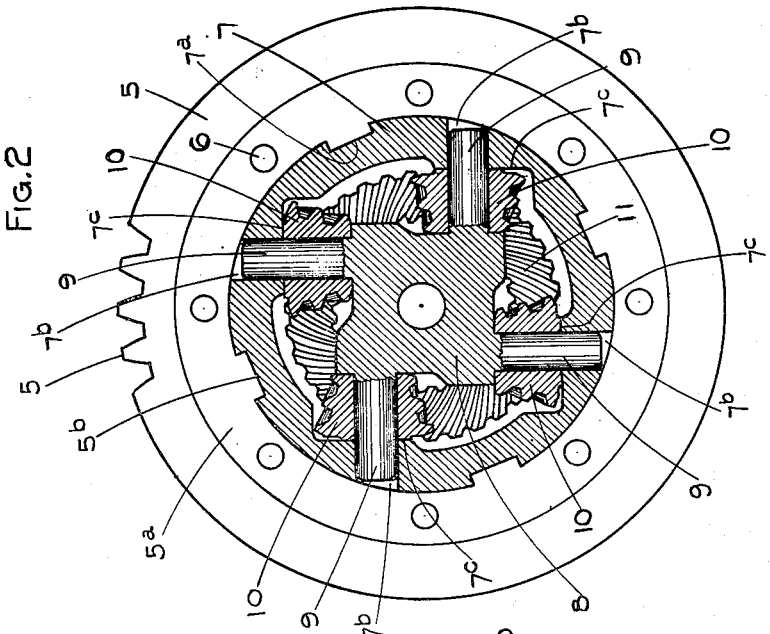
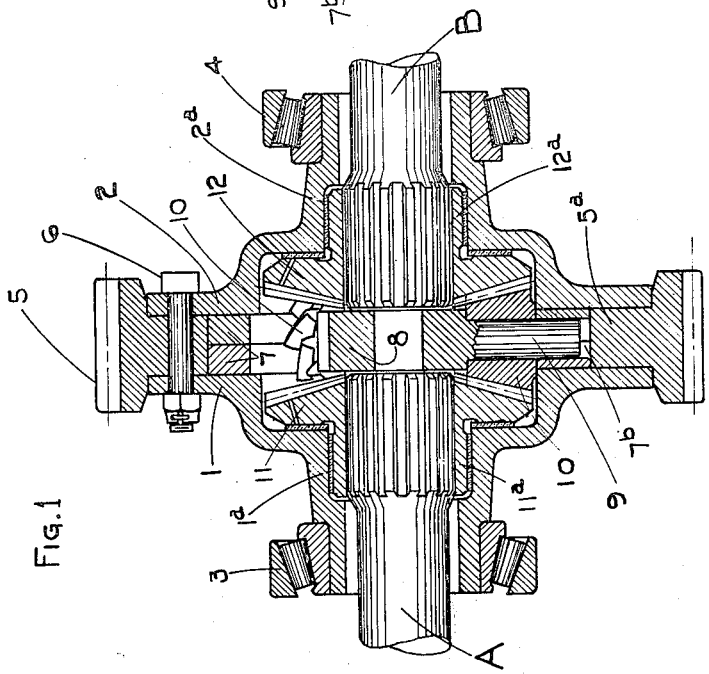
INVENTOR.
Vernon E. Gleasman
BY
ATTORNEYS Patented Feb. 17, 1953

2,628,508

UNITED STATES PATENT OFFICE 2,628,508

HYPOID DIFFERENTIAL GEAR

Vernon E. Gleasman, Elmira, N. Y.

Application June 17, 1949, Serial No. 99,848

3 Claims. (Cl. 74—715)

This invention is a novel improvement in differential gears, and the principal object thereof is to provide a differential employing a novel arrangement of hypoid gears or the like, whereby spinning of one shaft section due to loss of traction will be prevented due to inefficiency of the power transfer between axle gears, while permitting normal differential action such as when a vehicle is rounding a curve or the like.

Another object of the invention is to provide a rugged, compact, positive drive arrangement that can be utilized in most of the standard axle and pinion housing designs.

A further object of the invention is to provide a differential of the above type which is simple, novel, efficient, and relatively inexpensive to manufacture.

I will explain the invention with reference to the accompanying drawing, which illustrates one practical embodiment thereof, to enable others familiar with the art to adopt and use the same; and will summarize in the claims the novel features of construction, and novel combinations of parts, for which protection is desired.

In said drawings:

Figure 1 is a longitudinal section through a differential gear embodying my invention.

Fig. 2 is a side elevation thereof, partly in section, with one gear carrier removed to show the removable cartridge unit.

As shown, the differential comprises a pair of opposed gear carriers 1 and 2 having peripheral flanges and having hubs 1a and 2a respectively, through which pass the aligned axial shaft sections A and B in the conventional manner, the shaft sections A and B being provided with splined grooves on their adjacent ends. The hubs 1a and 2a may also carry the external anti-friction bearings 3 and 4 for mounting the differential in a housing in the usual manner.

An annular drive gear 5 having an internal annular flange 5a, is disposed between the adjacent faces of the peripheral flanges of the gear carriers 1 and 2, the flange 5a and the gear carriers 1 and 2 being provided with aligned bores to receive connecting bolts 6 or the like to form an integral unit, which however may be assembled or disassembled.

As shown in Fig. 2, the inner face of flange 5a is provided with a series of inwardly projecting driving keys 5b, four such keys being shown, although the number may be increased or decreased as desired, the keys 5b being disposed equal distances apart around the flange. Although I have shown keys as a driving means, it is obvious that bolts or the like passing through the rings 7 and gear carriers 1 and 2 may be utilized.

Within the chamber formed by the gear carriers 1 and 2 and gear 5 is a removable cartridge unit, the same consisting of a pair of substantially circular annular plates 7 whose peripheries correspond with the inner face of the flange 5a of gear 5, said peripheries of plates 7 being provided with recesses 7a receiving the driving keys 5b of said flange, as shown in Fig. 2, the plates 7 being removable when the gear carriers 1 and 2 are disassembled from gear 5, and the combined width of the plate 7 being equal to the width of the annular flange 5a. The primary purpose of providing a removable cartridge unit is to facilitate simplicity of machining and assembling.

Within the center of the annular plates 7 is a hub or block 8 forming a spider gear support, block 8 being of slightly less thickness than the combined thicknesses of the plates 7 and being interposed between the adjacent ends of the shaft sections A—B as shown in Fig. 1.

Hub 8 is provided with four integral cylindrical projections 9 which serve as journals for the hypoid pinions 10, four of which are shown in Fig. 2. Obviously more or less may be utilized. It will be noted from inspection of Fig. 2 that the projections 9 are offset equal distances in the same direction from the centers of the four faces of hub 8, so that the projections 9 are disposed adjacent the four corners of hub 8, the outer ends of the projections 9 each extending into bores 7b in the annular plates 7, the bores 7b being preferably formed half in one plate 7 and half in the other, as shown in Fig. 1, so that when the plates 7 are clamped around the hub 8, the projections 9 will be received in the bores 7b, the plates 7 being prevented from separation when in the assembly by means of the bolts 6.

The plates 7 are provided on their inner peripheries adjacent the bores 7b with bearing surfaces 7c which are disposed normal to the projections 9; and on the projections 9 between the bearing surfaces 7c and the hub 8 are journaled the hypoid pinions 10 hereinbefore referred to.

On the ends of the shaft sections A and B are gears 11 and 12 provided with hubs 11a and 12a, respectively, which are splined or otherwise keyed to the shaft sections, the gears 11 and 12 rotating within the chamber formed between the gear carriers 1 and 2 and meshing directly with each of the hypoid pinions 10, as shown in Fig. 1.

By an inspection of Fig. 2, it can be seen by varying the distance that the hypoid pinions 10 are mounted from the axis of the axle gears 11 and 12, as in hypoid gearing, and by also varying the helical angularity of the teeth of the pinions 10 any desired degree of inefficiency can be obtained in the hypoid drive of pinions 10 between the axle gears 11 and 12.

In operation

In operation the gear 5 would be driven by a prime mover in the usual manner to rotate the differential consisting of the gear carriers 1 and 2 and the gear 5; and normally, when the vehicle was running in a straight line, the axle sections A and B would be rotated at the same speed by engagement of the hypoid pinions 10 with the respective gears 11 and 12. In rounding a curve, however, one axle would tend to slow down and would thus impart a rotary motion to the pinions 10 to compensate for the difference in speeds of the axle sections A and B. By reason of inefficiency, due to the hypoid arrangement of the gears 10, 11 and 12, however, it would be impossible for one axle section A or B to spin in event its related wheel should lose traction by reason of angular thrust toward the axes of the spider gears; and therefore my novel differential provides a substantially positive type of differential which would prevent free-spinning of either axle section A or B when a wheel lost traction, although the differential has the ability to equalize drive on the axles when the surface of the terrain controls the difference in wheel or axle speeds. My differential therefore performs a different mechanical function from prior art differentials which permit spinning of one wheel, since in my construction there is no power transfer from one axle section to the other axle section, but merely a relaxation of power on one axle section as an increase in speed takes place on the other axle section due to the angular thrust towards the axis of the spider gears. With rotary power applied to ring gear 11 it is obvious that no rotary motion could be imparted to pinions 10, due to the thrust action being in parallel with the axis of rotation of the pinions instead of at right angles thereto, as in normal gear arrangements. However, if rotary power were applied to the pinions 10 instead of ring gear 11, it can be seen that the ring gear 11 could easily be driven. The arrangement would then be comparable to a worm and worm wheel gear arrangement, it being well known that when a worm gear arrangement reaches a certain ratio or spiral angle the worm pinion cannot be driven by applying rotary power on the worm wheel.

In applicant's device, in order to spin a wheel or axle, one or the other axle ring gears such as 11 would have to act as a planetary driver or sun gear, as a result of the other ring gear such as 12 being held stationary due to its greater traction on the road surface. But due to the inability of pinions 10 to impart rotary motion to the ring gear 11 the resultant wheel resistance would be equalized.

I do not limit my invention to the exact form shown in the drawing, for obviously changes may be made therein within the scope of the claims.

I claim:

1. A cartridge unit for differential gears comprising a pair of contacting annular plates; an offset spider gear support disposed within the annular plates, said support having a hub and having cylindrical projections on the peripheral faces of the hub each offset from the center of its related face equal distances in the same direction; said annular plates having offset semi-cylindrical grooves therein forming bores receiving the outer end portions of the respective projections; said annular plates having bearing surfaces on their inner peripheries adjacent to and normal to the projections; and pinions journaled on the projections between the bearing surfaces and the faces of the hub.

2. In a differential gear, having a pair of opposed gear carriers in which aligned spaced axle sections are journaled and having an annular drive gear, and having removable means for connecting the drive gear and gear carriers for rotation as a unit, said gear carriers having recesses in their adjacent faces together forming a chamber and housing for axle gears; a removable unit within the chamber comprising an annular member carried by the gear carriers for rotation therewith, an offset spider gear support disposed within the annular member, the support having a hub and having cylindrical projections on the peripheral faces thereof each offset from the center of the hub equal distances in the same direction, said annular member having bores receiving the outer end portions of the respective projections; said annular plates having bearing surfaces on their inner peripheries adjacent to and normal to the projections, and pinions journaled on the projections between the bearing surfaces and faces of the hub each meshing directly with the said axle gears.

3. In a hypoid differential gear, having a pair of opposed gear carriers in which aligned spaced axle sections are journaled and having an annular drive gear, and having removable means for connecting the drive gear and gear carriers for rotation as a unit, said gear carriers having recesses in their adjacent faces together forming a chamber and housing for axle gears; a removable cartridge unit within the chamber comprising a pair of annular plates disposed between the gear carriers; means for locking the plates to the gear carriers for rotation therewith, a block of substantially square cross-section and of less thickness than the space between the axle gears disposed within the annular plates, cylindrical projections on the peripheral faces of the block each offset from the center of its related face equal distances in the same direction whereby the projections are disposed adjacent the corners of the block, said annular plates opposed having semi-cylindrical grooves therein forming bores receiving the outer end portions of the respective projections; said annular plates having bearing surfaces on their inner peripheries adjacent to and normal to the projections, and hypoid pinions journaled on the projections between the bearing surfaces and faces of the block each meshing directly with the said axle gears.

VERNON E. GLEASMAN.

REFERENCES CITED

The following references are of record in the file of this patent:

UNITED STATES PATENTS

| Number | Name | Date |
|---|---|---|
| 1,213,258 | Redding | Jan. 23, 1917 |
| 1,248,687 | Loque | Dec. 4, 1917 |
| 1,396,225 | Loque et al. | Nov. 8, 1921 |
| 1,445,865 | Alder | Feb. 20, 1923 |
| 1,460,064 | Keck | June 26, 1923 |
| 1,622,556 | Wildhaber | Mar. 29, 1927 |
| 1,657,091 | Morgan | Jan. 24, 1928 |
| 1,719,803 | Fickett | July 2, 1929 |